(No Model.) 2 Sheets—Sheet 1.
J. T. HARRIS.
METHOD OF AND APPARATUS FOR PURIFYING LIQUIDS.
No. 531,183. Patented Dec. 18, 1894.
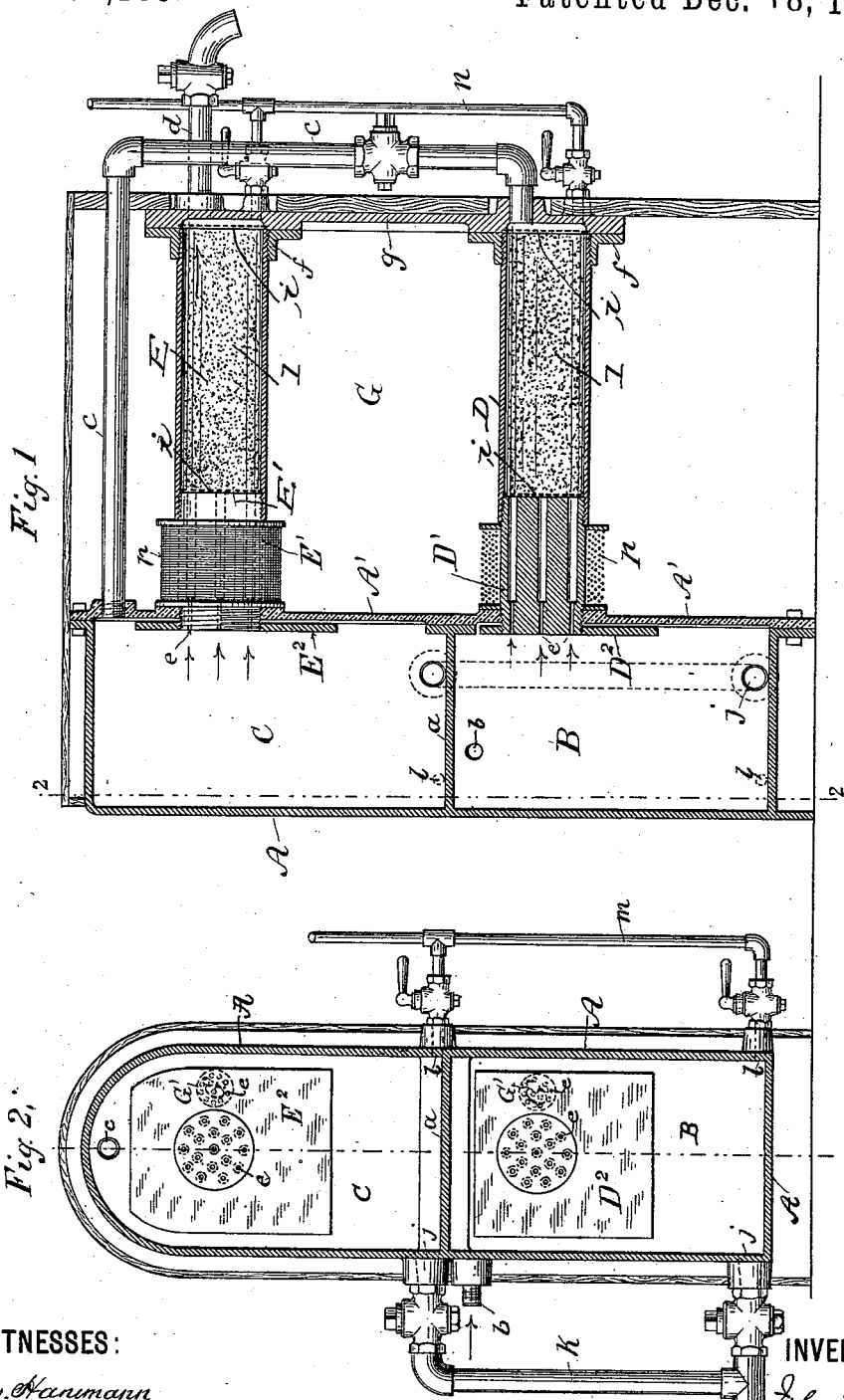
WITNESSES:
Chas. Hanmann
N. Marlin
INVENTOR
John T. Harris
BY
Chas. W. Forbes
ATTORNEY (No Model.) 2 Sheets—Sheet 2.
J. T. HARRIS.
METHOD OF AND APPARATUS FOR PURIFYING LIQUIDS.
No. 531,183. Patented Dec. 18, 1894.
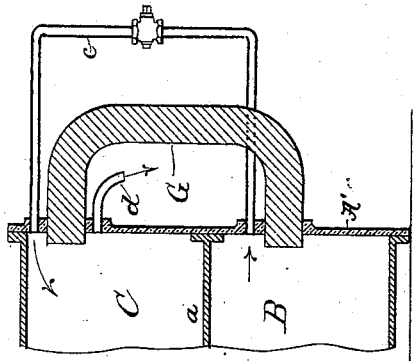
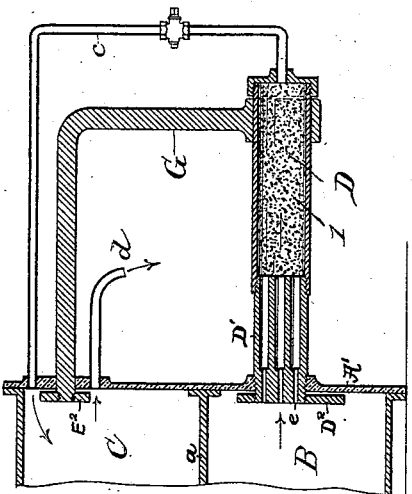
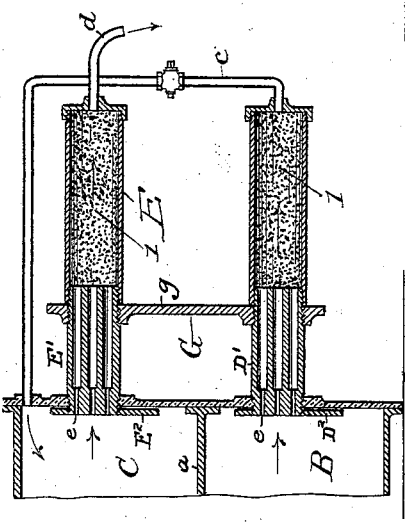
WITNESSES:
Chas. Hanimann
H. Marler
INVENTOR
John T. Harris
BY
Chas. W. Forbes
ATTORNEY

UNITED STATES PATENT OFFICE.

JOHN T. HARRIS, OF NEW YORK, N. Y.

METHOD OF AND APPARATUS FOR PURIFYING LIQUIDS.

SPECIFICATION forming part of Letters Patent No. 531,183, dated December 18, 1894.

Application filed October 17, 1890. Serial No. 368,418. (No model.)

*To all whom it may concern:*

Be it known that I, JOHN T. HARRIS, a citizen of the United States, residing in the city, county, and State of New York, have invented certain new and useful Improvements in Methods of and Apparatus for Purifying Liquids, of which the following is a specification.

This invention relates particularly to the purification of water or other liquid whether under pressure or not. In many muddy waters, notoriously the Mississippi waters, the impurities held suspended thereby are in the form of impalpable powder, and being such are difficult to remove especially where there is a strong current in the apparatus, and it is one of the objects of this invention to provide a simple and effective method and means by which such impurities are held back, thrown down or removed.

To this end it consists in the novel method and apparatus hereinafter set forth and employed either alone or in conjunction with any mechanical or chemical means of filtration whereby all classes of impurities are removed from the water or other liquid that passes through the apparatus.

The invention is based upon the well known principle in natural philosophy that every material body is subject to magnetic influence, and is either paramagnetic or diamagnetic. Paramagnetic substances as are attracted by a magnet are iron, nickel and cobalt, either chemically pure or in their oxides or salts; and substantially all other materials are diamagnetic and are repulsed more or less by a magnet. This latter property is utilized in the present invention to repel the diamagnetic particles held suspended in the liquid, whereby the liquid is purified and allowed to pass on free from such particles.

In the practice of the method there is provided one or more permanent or electro-magnets supported in position so as to be more or less immersed by or be in the path of the flow of liquid as it passes onward for use and in such manner that the liquid with its impurities is subjected to the repelling force of the magnet either while at rest or in its onward flow, whether its flow be regular or intermittent. The particular location of the magnet or magnets and its or their construction or form will depend largely upon the class of apparatus with which it or they may be used, and upon practical experience as to which is most effectual, it simply being necessary that the liquid, either as a stream or as a body, shall pass or flow, or be confined within the influence of the magnet or magnets whereby the impurities carried by such liquid may be properly and effectually removed, held back or caused to settle.

In the practical application of the invention, it is obvious that the style of apparatus may be varied within wide limits; but there is shown in the accompanying drawings a filter of a special construction adapted to a special form of the magnets, such being the preferred form, so far as present experience has demonstrated.

In said drawings:—Figure 1, is a transverse sectional elevation of the improved apparatus and adapted to the carrying out of the improved method. Fig. 2, is a cross sectional elevation taken on the line 2, 2, of Fig. 1. Figs. 3, 4 and 5 are transverse sectional elevations showing different forms of the magnet.

As a better understanding of the improved method will be had by describing an apparatus designed to employ such method, such description will now be given.

The apparatus shown consists of a casing A providing two chambers B, C, separated from one another by a partition *a*. These chambers are shown as arranged one above the other, but may obviously be otherwise disposed. The chamber B forms an induction chamber and is provided preferably at or near its upper end with an induction orifice *b*, having connection with a liquid supply pipe or main from which the water is directed into the chamber B. The induction orifice is located at the upper end of the chamber B so that the lower portion of said chamber may serve as a collecting basin for the impurities that are thrown down from the water that is passing under or is within the influence of the magnet.

The chambers B and C are connected by a conduit D, one end of which is in communication with the upper portion of the chamber B and the opposite end in communication with the end of a pipe *c*, the other end of which is in communication with the upper portion of the chamber C so that the liquid from the chamber B may pass therefrom through the conduit D and pipe $c$, into the chamber C, as will be apparent. The liquid from the chamber C will then pass by a conduit E, one end of which is in communication with said chamber C, into an eduction pipe $d$, that is in communication with the opposite end of said conduit by which the liquid may pass on or be drawn off for use.

The conduits D and E are of similar construction and similarly arranged with respect to their respective chambers B and C, and these conduits, as will afterward appear, form portions of the magnet under the influence of which the water is caused to pass.

At the chamber-end of the conduits D and E they are screw-threaded or otherwise secured to the outer end of magnetic bars $D'$, $E'$; the opposite or inner end of each of which bars is similarly screw-threaded into the plate $A'$, forming a portion of the casing A. This plate, in order to insulate the magnetic bars from the casing A proper, is preferably formed of brass. The inner ends of each of the magnet bars $D'$, $E'$, project into the chambers B, C, and are there provided with plates $D^2$, $E^2$, which present a large magnetic surface to the liquid within each of the chambers. The magnet bars are each preferably of circular form and are each perforated with a number of fine openings $e$, which merge into larger ones, which in turn communicate with its respective conduit. The opposite end of each of the conduits D and E is secured by an annulus $f$, to a bar $g$, common to both of the conduits, and thus the magnetic bars $D'$, $E'$, the conduits D and E and the bar $g$ form a U-shaped magnet G, one pole of which is in communication with one chamber and the other pole with the other chamber so that the liquid in one chamber is wholly under the influence of the other pole of the magnet, and the liquid subjected to the independent action of the opposite poles of the magnet and in succession.

In the practice of the method, the liquid is allowed to pass into the chamber B so that it completely fills it. The liquid while in the chamber is thus constantly under the influence of one pole of the magnet, which, owing to its repelling action upon all diamagnetic particles, will act to repel such particles from its surface so that the liquid that is in contact therewith will have had its impurities removed therefrom and being thus purified may pass from the chamber, or as shown pass in small streams through the orifices $e$, of the magnet bar $D'$, into the conduit D. The body of liquid at one side of the magnet serves as a convenient means for holding or carrying off the repelled particles so that they may finally settle or collect in a condition to be discharged from the chamber. In other words, the liquid under treatment serves also as a vehicle to carry the particles from the magnet as they are repelled.

In causing the liquid to pass in small streams through the magnet bar, the larger body of liquid from the chamber B is minutely subjected to the influence of the magnet so that the impurities which have been too fine to be repelled by the action of the face of the magnet will be brought more intimately therewith and be repelled during the flow of the liquid through the orifices of the magnet bar. The influence of this pole of the magnet still acts but with a decreasing force as the liquid enters and passes through the conduit D until it enters the pipe $c$, by which it is carried into the chamber C. This latter chamber will also be allowed to become filled with the liquid and such liquid will be again brought under the influence of the magnet, but with its opposite pole, thereby again subjecting it to the repelling force thereof and will pass by the orifices $e$, through the magnet bar $E'$, into the conduit $E^2$ still under magnetic influence but with a gradually decreasing force, and thence by the eduction pipe $d$ to the place of use.

By arranging the poles of the magnet so that they will act upon independent bodies of water, the full effect of the magnetic action of the magnet is had, and the bodies of water each act as a medium for conveying off and allowing to settle at the bottom of the respective chambers the diamagnetic substances repelled by each of the poles of the magnet.

In order to increase the power of the magnet, each of its poles, or the magnet bars, is wound with one or more coils of wire $p$, arranged in an electric circuit, in a manner well understood. So too, the plates $D^2$, $E^2$, may obviously be extended or reduced in size so as to present a greater or less magnetic surface to the body of water within the chambers as may be found desirable in practice. Again, the magnetic action upon the liquid may be increased by duplicating the magnet as indicated by dotted circles $G'$, and its respective poles may be connected with the same magnet plates $D^2$, $E^2$, or with other or independent plates.

In Fig. 3, the magnet G is shown as consisting simply of the magnet bars and said plate $g$, in which case, the conduits D, E, will not be magnetic and do not form portions of the magnet proper, but will simply serve to convey the liquid onward.

In Fig. 4, the magnet G is formed with one hollow portion through which the liquid may be conveyed from one chamber to the other, the other portion of the magnet being solid and of bar form, the water passing from the chamber in proximity to the bar pole of the magnet directly through the eduction pipe $d$.

In Fig. 5, a further modification is shown in which the magnet G is of the ordinary U form with its poles projecting one into each chamber of the filter. In this case the water will pass from one chamber to the other by the pipe $c$ and will pass from the last chamber by the eduction pipe $d$, the orifices in both pipes being in close proximity with the poles of the magnet.

While these several obvious modifications of the invention may be used, it is to be understood that the structure shown in Figs. 1 and 2 is the preferred one.

Referring again to the construction embodying the conduits D and E, they each obviously hold or form a bed of filtering material 1 such as gravel, charcoal and the like, or may contain iron chips which will become more or less magnetized by contact with the magnet bar so as to further and more intimately place the water under the repelling effect of the magnet. In either case each end of the conduits D and E will be provided with a perforated plate or screen $i$, so as to confine the filtering or magnetized material and prevent it from washing out either into the pipes $c$ and $d$ or into the openings or orifices of the magnet bars. When the conduits are filled with a filtering material, such as gravel or charcoal, both of the conduits may contain the same or different material. Thus, the lower conduit D may contain gravel while the upper conduit may contain charcoal, or vice versa; or one may contain magnetized material and the other ordinary filtering material, or a combination of the two.

Any method of washing out the chambers or conduits may obviously be employed, but as shown the chambers B, C, are each provided at their lower ends with discharge orifices $j$, in communication with a mud pipe $k$ that is controlled by suitable valves. At the opposite end of the chambers, they are each provided with a washing-out pipe $m$, also controlled by suitable valves, so that the mud or sediment or muddy water collected within each of the chambers may be washed out through the orifices $j$ and mud pipe $k$ to the sewer or other conduit or receptacle, and thus the chambers may be properly cleansed from time to time as may be found necessary.

The conduits D and E are similarly provided with orifices connected with a washing-out pipe $n$, controlled by valves, which valves when open will allow the water to pass through each of the conduits and the orifices of the magnet bars and thence into their respective chambers and be discharged out through the orifices $j$ and mud pipe $k$, as before explained. The washing-out pipes $m$ and $n$ may obviously be the same pipe with suitable branches leading to each of the chambers and to each of the conduits as is obvious.

What is claimed is—

1. The herein described method of purifying liquids which consists in successively presenting to a moving body or stream of liquid being treated, magnetic poles of different polarity in such manner that the impurities in the liquid are successively and diamagnetically repelled in the direction opposite to the movement of the stream, substantially as set forth.

2. In a liquid purifying apparatus, the combination of a settling chamber, an outlet pipe leading therefrom, and a magnet pole piece extending along the side of said pipe and physically projecting into said chamber, whereby the impurities repelled by the pole piece are prevented from entering the pipe, substantially as described.

3. In a liquid purifying apparatus, the combination of a continuous passage for a flowing body of liquid, and a magnet the two poles of which are physically inserted at successive separated points in said passage, the poles being inserted relative to the outward direction of the passage so that the magnetic force repels the diamagnetic particles in the liquid in like manner at both poles and in a direction opposite to the outward flow of the liquid whereby such particles are prevented from passing onward, with the liquid from which the particles have been repelled, substantially as described.

4. In a liquid purifying apparatus, the combination of a settling chamber, an outlet therefor, a magnet pole piece in said chamber, a second settling chamber into which said outlet leads, an outlet from said second chamber, and the other pole piece of the magnet in said second chamber, the two poles being arranged in the chambers substantially parallel with the direction of the outlets therefrom whereby the impurities repelled by the pole pieces are prevented from entering each outlet, substantially as described.

5. In a liquid purifying apparatus, the combination, with a settling chamber, of an outlet pipe opening into said chamber, and a magnet pole piece projecting physically into the chamber and located about the entrance to said outlet pipe, whereby the impurities repelled by the pole piece are prevented from entering said pipe, substantially as described.

6. In a purifying apparatus, the combination with two separated chambers for the liquid, of a magnet, the opposite poles of which are arranged one in each chamber above the lower portion of the chamber to permit the repelled particles to settle therein through the body of liquid being treated, and a conduit from each chamber adapted to convey the purified liquid from the chambers above their said lower portions substantially as described.

7. In a filtering apparatus, the combination with two separated chambers, of a magnet, the poles of which are arranged one in each chamber and conduits for leading off the treated liquid from the face of the magnet poles, substantially as described.

8. In a filtering apparatus, the combination with two separated chambers, of a plurality of magnets, the poles of which are arranged with one polarity in each chamber and conduits for leading off the treated liquid from the face of the magnet poles, substantially as described.

9. In a filtering apparatus, the combination with two separated chambers for the liquid, of a hollow or perforated magnet, the poles of which are in connection one with each chamber and both serving as a conduit for the liquid from the face of the magnet poles, substantially as described.

10. In a filtering apparatus, the combination with two separated chambers for the liquid, of a plurality of hollow or perforated magnets, the poles of which are in connection one polarity with each chamber and serving as a conduit for the liquid from the face of the magnet poles, substantially as described.

11. In a filtering apparatus, the combination with one or more chambers for the liquid, a mud pipe or pipes therefor and a washing-out pipe or pipes in communication with said chamber or chambers, of a magnet in position in the chamber or chambers adapted to repel the impurities in the liquid and cause them to settle downwardly aided by gravity, and a conduit the entrance to which is at the surface of the magnet pole piece at a point within the strongest field of the lines of force and arranged to conduct off the purified liquid in a direction opposed to the repellent action of such lines of force, as set forth.

12. In a filtering apparatus, the combination with one or more chambers for the liquid, and a mud pipe or pipes therefor, of a hollow or perforated magnet in position to subject the liquid to its repelling influence and to act as a conduit therefor, and a washing-out pipe or pipes connected with said hollow magnet for washing out the same, substantially as described.

13. The combination of one or more chambers for the liquid, a filtering bed therefor, containing magnetizable material a magnet adjacent said filtering bed to magnetize said material and interposed between the chamber or chambers and said filtering bed, and a conduit for leading the liquid from the face of the magnet pole to the filtering bed, substantially as described.

14. The combination of two separated chambers, a filtering bed in communication with each chamber a magnet interposed between each chamber and the filtering bed, and a conduit for leading the liquid from the face of the magnet pole to the filtering bed, substantially as described.

15. The combination with one or more chambers for the liquid, of a perforated electro-magnet in position to subject the liquid in the chamber or chambers to its magnetic influence, said perforations forming a conduit for leading off the liquid from the face of the perforated magnet, substantially as described.

16. The combination with one or more chambers for the liquid, of a magnet in position to subject the liquid in the chambers to its magnetic influence and carrying a plate within the chamber for increasing the magnetic surface and adapted to repel the impurities in the liquid and cause them to settle downwardly aided by gravity, and a conduit the entrance to which is at the surface of said plate at a point within the strongest field of the lines of force and arranged to conduct off the purified liquid in a direction opposed to the repellent action of such lines of force, as set forth.

17. The combination with one or more chambers for the liquid, of a hollow or perforated magnet in position to subject the liquid in the chamber to its magnetic influence and carrying a plate within the chamber for increasing its magnetic surface, and through which hollow magnet the treated liquid is drawn off from the chamber, substantially as described.

18. The combination with two separated chambers, of a magnet, having hollow poles one pole of which is in communication with each chamber, a pipe extending from one hollow pole to the other chamber, and a discharge pipe extending from the other hollow pole, substantially as described.

19. In a filtering apparatus, the herein described filtering bed composed of magnetized material through which the liquid being treated may pass and a contiguous magnet for magnetizing such material.

20. In a filtering apparatus, the combination of a conduit for the liquid, a body of magnetized filtering material confined in said conduit and a contiguous magnet for magnetizing such material, substantially as described.

21. The combination with a liquid chamber and an electro magnet, the helix of which is wholly without the chamber and its pole piece extending within the chamber and insulated therefrom, of liquid supply and discharge conduits leading to and from said chamber, substantially as described.

In witness whereof I have hereunto set my hand, in the presence of two witnesses, this 10th day of October, 1890.

JOHN T. HARRIS.

Witnesses:
GEO. H. GRAHAM,
N. MARLER.